(12) United States Patent
Ting

(10) Patent No.: US 9,372,344 B2
(45) Date of Patent: Jun. 21, 2016

(54) DRIVING INFORMATION DISPLAY DEVICE

(71) Applicant: TaiLai Ting, Pomona, CA (US)

(72) Inventor: TaiLai Ting, Pomona, CA (US)

( * ) Notice: Subject to any disclaimer, the term of this patent is extended or adjusted under 35 U.S.C. 154(b) by 308 days.

(21) Appl. No.: 13/987,055

(22) Filed: Jun. 27, 2013

(65) Prior Publication Data

US 2015/0002543 A1    Jan. 1, 2015

(51) Int. Cl.
*G09G 5/00* (2006.01)
*G02B 27/01* (2006.01)
*G06T 19/00* (2011.01)

(52) U.S. Cl.
CPC .............. *G02B 27/01* (2013.01); *G06T 19/006* (2013.01); *B60R 2300/205* (2013.01); *G02B 2027/0154* (2013.01)

(58) Field of Classification Search
CPC ...................................................... G06T 19/006
See application file for complete search history.

(56) References Cited

U.S. PATENT DOCUMENTS

| | | | | |
|---|---|---|---|---|
| 4,722,601 A * | 2/1988 | McFarlane | .................. | 356/141.3 |
| 4,988,976 A * | 1/1991 | Lu | .................................. | 340/461 |
| 5,231,379 A * | 7/1993 | Wood et al. | ........................ | 345/9 |
| 5,986,583 A * | 11/1999 | Nakano | .................. | G01C 21/16 340/988 |
| 6,265,984 B1 * | 7/2001 | Molinaroli | .................. | 340/815.4 |
| 6,559,761 B1 * | 5/2003 | Miller et al. | .................. | 340/435 |
| 6,724,538 B2 * | 4/2004 | Kushida et al. | ................ | 359/630 |
| 7,043,342 B1 * | 5/2006 | Dewees | ............................ | 701/1 |
| 7,885,692 B2 * | 2/2011 | Cascone | .................... | 455/575.2 |
| 2002/0140633 A1 * | 10/2002 | Rafii | ....................... | B60K 35/00 345/8 |
| 2006/0132914 A1 * | 6/2006 | Weiss et al. | ..................... | 359/462 |
| 2006/0132924 A1 * | 6/2006 | Mimran | ........................ | 359/630 |
| 2007/0182536 A1 * | 8/2007 | Prywes | .......................... | 340/461 |
| 2008/0088526 A1 * | 4/2008 | Kadantseva et al. | ........... | 345/1.1 |
| 2010/0165429 A1 * | 7/2010 | Buckley et al. | .................... | 359/9 |
| 2011/0077028 A1 * | 3/2011 | Wilkes, III | ............ | B60W 50/14 455/456.3 |
| 2012/0050144 A1 * | 3/2012 | Morlock | ........................... | 345/8 |
| 2013/0138392 A1 * | 5/2013 | Kumon et al. | ................ | 702/152 |

FOREIGN PATENT DOCUMENTS

WO    WO 2012023480 A1 *   2/2012

\* cited by examiner

*Primary Examiner* — Charles Tseng
(74) *Attorney, Agent, or Firm* — Raymond Chan

(57) ABSTRACT

A driving information display device includes a data generator for generating driving information of a vehicle and a display unit linked to the data generator for being supported at a desired location of the vehicle. The display unit provides visualizations regarding driving information to a driver during driving. These visualizations relates to driving data if the user is operating a motorized vehicle, GPS navigational information, etc. These visualizations are then provided at the driver's field of vision, which allows the driver to keep the eyes on the road while still being able to analyze the information. This allows the driver to operate the vehicle safely and in turn enjoy more fulfilled and enjoyable driving experience.

18 Claims, 9 Drawing Sheets

DRIVING INFORMATION DISPLAY DEVICE

CROSS REFERENCE OF RELATED APPLICATION

This is a non-provisional application of a provisional application, application No. 61/809,861, filed Apr. 8, 2013.

NOTICE OF COPYRIGHT

A portion of the disclosure of this patent document contains material which is subject to copyright protection. The copyright owner has no objection to any reproduction by anyone of the patent disclosure, as it appears in the United States Patent to and Trademark Office patent files or records, but otherwise reserves all copyright rights whatsoever.

BACKGROUND OF THE PRESENT INVENTION

1. Field of Invention

The present invention relates to driving information display, and more particularly to a driving information display device that is able to be displayed in the driver's field of vision while driving.

2. Description of Related Arts

Taking your eyes off the road for a split second is all it takes to get into a vehicular accident, and this is especially true the faster the vehicle is traveling. Studies have shown that a fairly average reaction time for a human is approximately 0.75 seconds, and more often than not this reaction time can be more than this average due to external factors such as personal characteristics, alertness, and visual acuity. This 0.75 seconds may sound like very little but in combination with application of the brakes of a vehicle as well as the stopping distance required at certain speeds, even a driver following proper driving safety is still liable to cause an accident. For example, a car traveling at 65 miles per hour will travel approximately 70 feet in the 0.75 seconds during the reactionary processing. Additionally, it takes about 0.3 seconds to apply the brake, during which the car will travel approximately another 28 feet. And the stopping distance for a car under the best road conditions traveling at that speed is approximately 188 feet. So this means that under nearly ideal conditions an alert driver can avoid hitting obstacles that are no less than 300 feet away. When you add in various other external distractions, even a driver abiding by the 2-second distance rule is likely to encounter a vehicle collision. And this is especially true for motorcyclists, where high speed accidents are generally more fatal, or even regular cyclists where collisions are likely to throw a ride off their vehicle.

With the modernization of these types of vehicles the amount of information present to the user has also increased. Various readouts and gauges relating to performance communicate information to the user that can be vital to the vehicular experience. These instruments are generally located on a dashboard, or in an area that requires the user to tilt their head or almost completely shift their vision from the road to view these instruments. The instrument placement on vehicles makes it hard for the user to focus on the instruments, process the information, and then focus back on the road quickly. When the user has to temporarily remove their vision from the road or even physically reorient their head to see this information to process these instruments, the likely hood of getting into a vehicular collision is increased. If the user was able to get this driving information without having to take their eyes away from the road a much more enjoyable riding experience could be achieved.

Current devices exist that mount battery powered devices onto a user's helmet to display the driving information, but these devices provide many disadvantages. One of the largest disadvantages is that since the device mounts onto the user's helmet to display the driving information, it is highly likely to obscure the user's vision and create confusion with real world objects. Additionally, the user is unable to turn it off while operating the motorcycle as a hand would have to be taken off the steering mechanism to do such since it is always activated. Similarly, if the device becomes dislodged or disoriented during operation it can be very dangerous for the user to re-orientate the device while operating the motorcycle.

SUMMARY OF THE PRESENT INVENTION

A main object of the present invention is to provide a driving information display device that allows a user to view or observe driving information without having redirect their field of vision away from the road.

Another advantage of the invention is to provide a driving information display device which provides driving information within the front view range of the driver during driving.

Another advantage of the invention is to provide a driving information display device able to display driving information such as speed without having to process the locomotive information of a vehicle.

Another advantage of the invention is to provide a driving information display device able to display driving information gathered from a mobile device such as a GPS device, an inertia measurement unit, or a cellular phone equipped with either of the previous devices.

Another advantage of the invention is to provide displayable driving information, wherein the user is able to customize which information is displayed.

Another advantage of the invention is to provide displayable driving information to the user without obstructing the user's view of the road.

Another advantage of the invention is to provide a driving information display device that is able to be used with any type of vehicle.

Another advantage of the invention is to provide a method of providing the driving information onto an area viewable by the user.

Another advantage of the invention is to provide a method of providing the driving information onto the screen and is togglable by the user.

Additional advantages and features of the invention will become apparent from the description which follows, and may be realized by means of the instrumentalities and combinations particular point out in the appended claims.

According to the present invention, the foregoing and other objects and advantages are attained by a driving information display device.

In accordance with another aspect of the invention, the present invention comprises a projection mechanism and adjustment mechanism housed within a housing body containing a projection cavity which allows a projection field from the projection mechanism to be unobstructed when the projection mechanism is activated, a signal unit that can transmit and receive the information regarding the driving information as well as process the information into a visualization to be projected to the user, a fastening arrangement to mount the device so that the projected visualizations are within the field of vision of the user, an activation switch to toggle the activation of the device, and a screen whether virtual or physical where the projected visualization can be seen by the user when operating a vehicle.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

According to the preferred embodiment, the driving information display device, which is a portable external device supported at the vehicle, comprises a display means for displaying information at the user's visual field 112 and a data generator for generating or collecting the information to be displayed. The display means comprises a projection mechanism 10 and the data generator comprises a signal unit 60.

Figure 1:
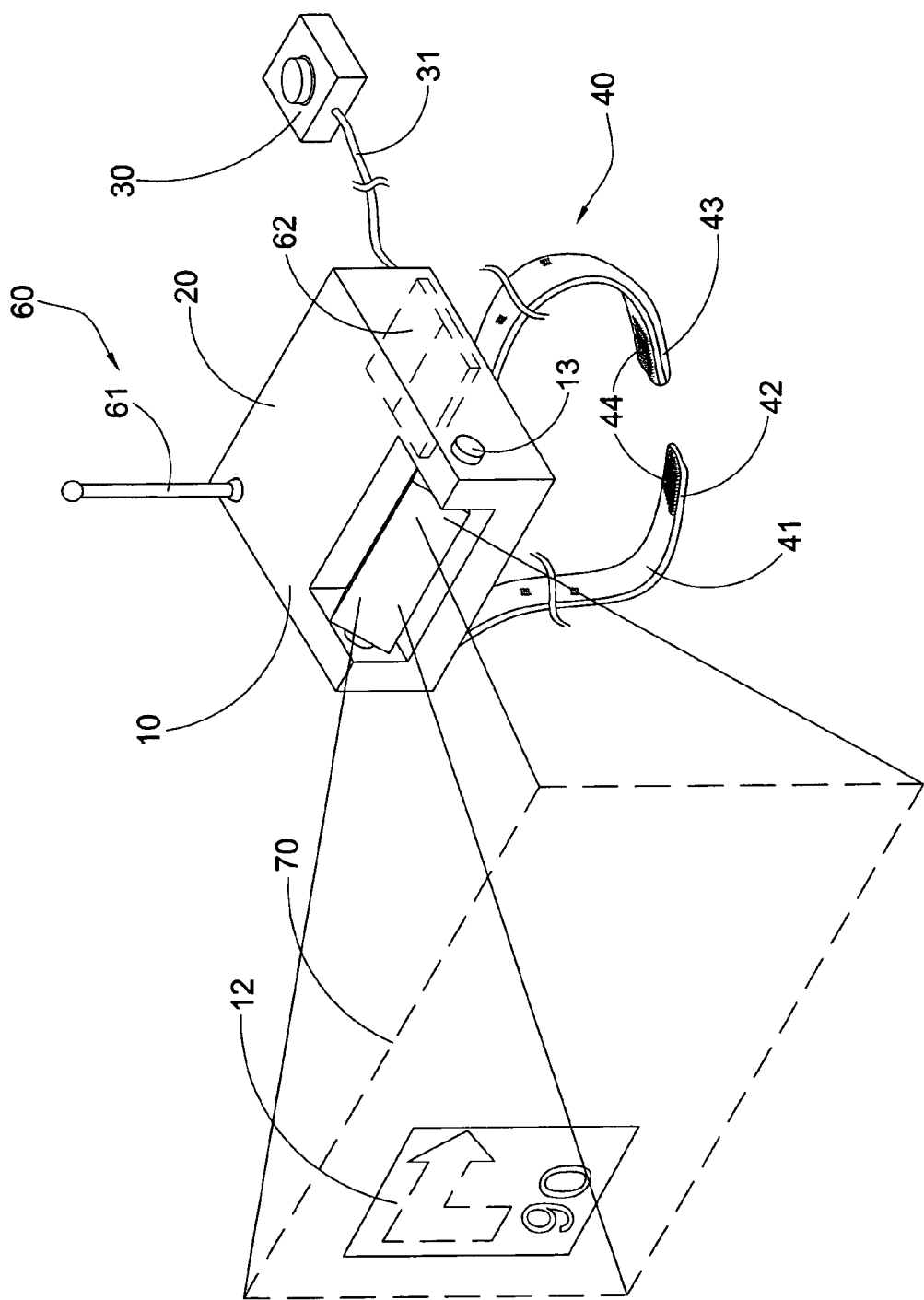
FIG. 1 is a perspective view of the driving information display device in the preferred embodiment of the present invention.

FIG. 1 is a perspective view of the driving information display device in the preferred embodiment of the present invention. The preferred embodiment of the present invention of a driving information display device further comprises a housing body 20, wherein housed within this housing body 20 are the projection mechanism 10, an adjustment mechanism 13, and the signal unit 60. The signal unit 60 in this preferred embodiment comprises an antenna 61 and CPU 62 that is able to receive both GPS data information directly from the satellites or relayed through a cellular phone or an inertia measurement unit. The signal unit 60 picks up the relevant information transmitted and then the information is transformed into a coherent visualization 12 which is then projected by the projection mechanism 10 onto screen surface 70. This information is customizable by the user, i.e. the driver, and can relate to speed, distance traveled, direction, GPS navigation, engine performance, fuel consumption, etc. In other words, the signal unit 60 can be connected to the computerized device of the vehicle, such as motorcycle, to collect the information, i.e. engine performance, fuel consumption, etc, in order to send the signal to the projection mechanism 10. The projection mechanism 10 projects the coherent visualization 12 relating to the driving information of the user's choice onto a screen surface 70. It is worth mentioning that the projection mechanism 10 can incorporate with a reflective mirror to reflect the image, i.e. the visualization 12, to a desired location within the user's line of sight. In additional embodiment this screen surface can be realized as any real or virtual surface within the user's line of sight.

The driving information display device can be affixed to an area of the motorcycle where the projection mechanism 10 is able to project the coherent visualizations 12 within the line of sight of the user. Due to this, the housing body 20 is affixed to an area of the motorcycle able to realize this objective. In this preferred embodiment of the present invention the driving information display device is affixed to the motorcycle by means of a fastening arrangement 40 which is embodied as a elongated strap 41 with two end lengths 42 and 43 with a hook and loop fastener on each end of the elongated strap respectively. This elongated strap is long enough to where it is able to fit around a portion of the body of the motorcycle to affix the present invention of the driving information display device firmly. This fastening arrangement 40 secures the housing body 20 onto the area of the motorcycle where the projection mechanism 10 is able to project the coherent visualization 12 of the driving data onto the windshield 71 of the motorcycle. This fastening arrangement 40 firmly secures the driving information display device without any risk of movement.

A main objective of the invention was to be able to project driving information to the user without obscuring the user's vision in such a way that the user would not have to remove his or her line of sight away from the road. So that the coherent visualizations 12 do not obscure the user's line of sight when operating the motorcycle, the visualizations 12 are only formed via an activation means. Accordingly, the activation means comprises an activation switch 30. In other words, the visualizations 12 are only called when the activation switch 30 is pressed by the user. This activation switch 30 is electrically connected to the housing body 20 and projection mechanism 10 by an elongated wire 31 so that the activation switch 30 can be mounted close to the user's hand on the handlebars of the motorcycle in this present embodiment. The position of the activation switch 30 allows the user to operate the activation switch 30 by quickly and simply moving their thumb and pressing the switch, this allows the user to focus on safely operating the motorcycle and enjoy the experience of the motorcycle more.

It is appreciated that the activation means comprises a voice control 31 to control the housing body 20 and the projection mechanism 10. Therefore, the visualizations 12 are voice-controlled when the voice control 31 is activated by the user. Once the user activates the projection mechanism 10 by voice, the projection mechanism 10 will display the driving information within the driver's line of sight.

Figure 2:
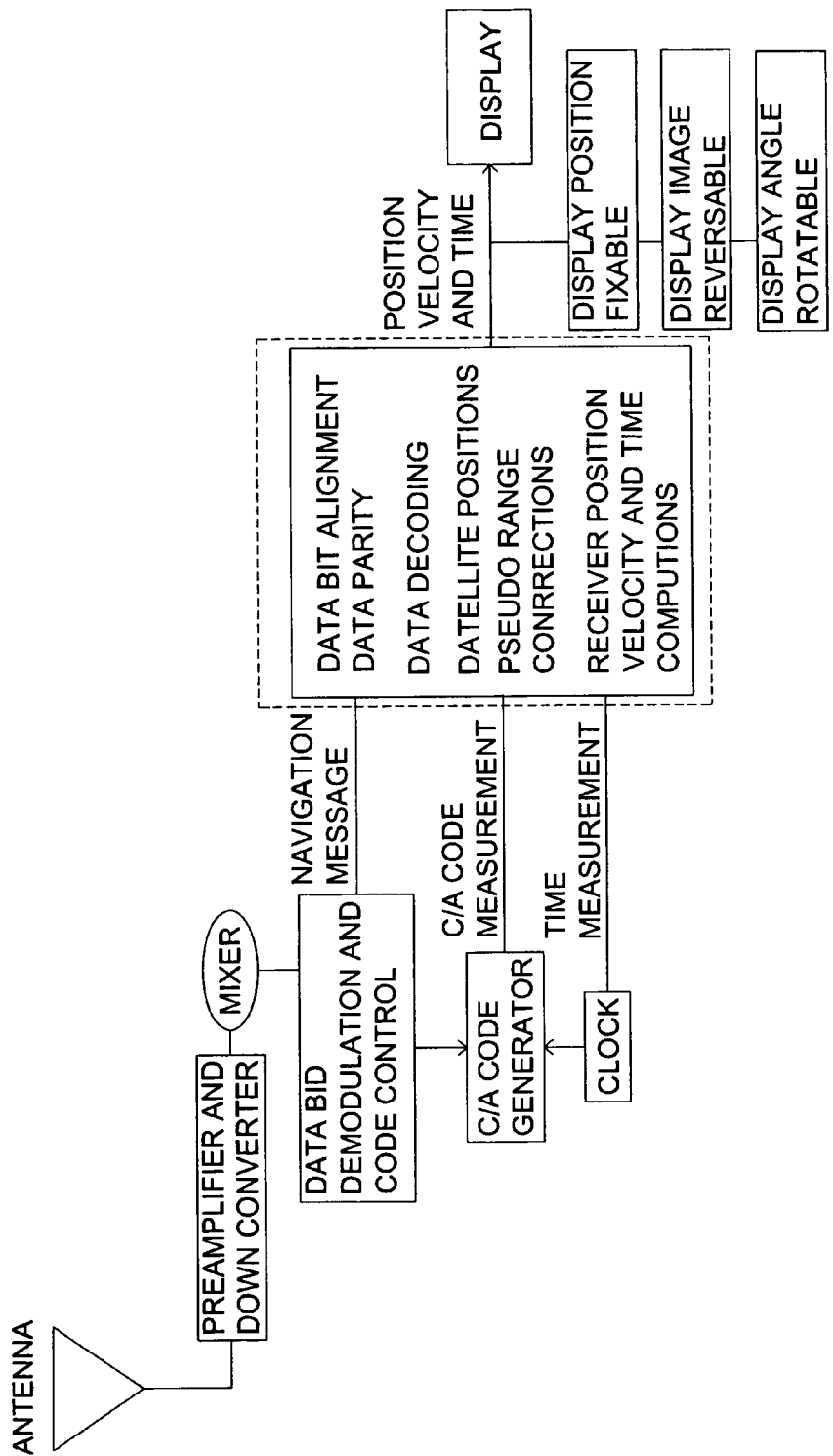
FIG. 2 is a block diagram of the driving information display device in the preferred embodiment of the present invention.

FIG. 2 is a block diagram of the driving information display device in the preferred embodiment of the present invention. This block diagram illustrates the operational workings of how the signal unit 60 interprets the GPS satellite data. The operation of the GPS unit represents a prior art of receiving the signals from a GPS satellite and using 3D trilateration to determine a user's position, but the portion relevant to the present invention is utilizing this information to create a display a fixable position, a reversible image, and a rotatable angle of the user. The signal unit 60 receives the GPS information and through this is able to calculate various driving information such as speed, driving topography, or even navigational data. This various information can be customized in the driving information display device to project only the coherent visualizations relevant to the user.

Figure 3:
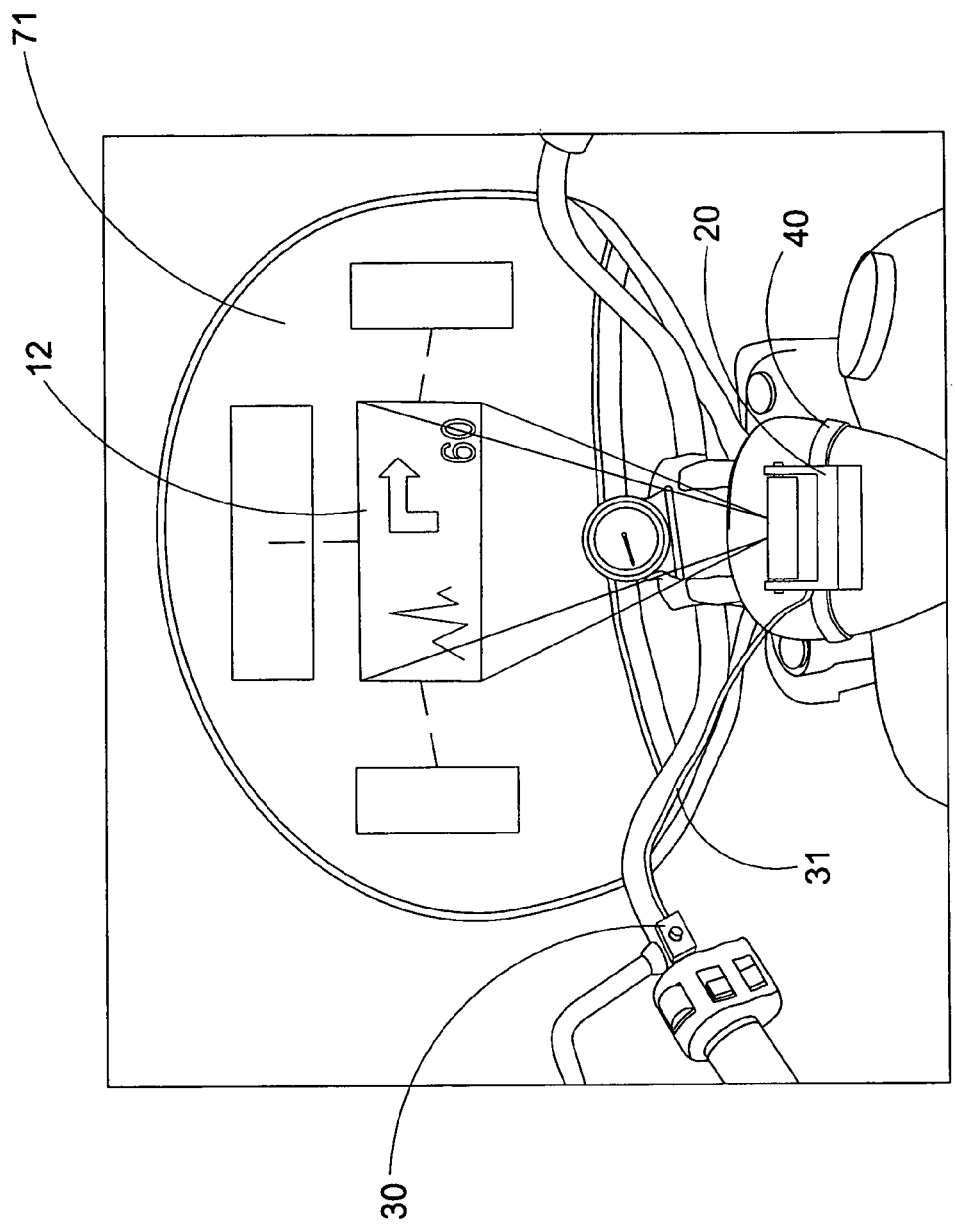
FIG. 3 is an operational view of the present invention of a driving information display device in the preferred embodiment of the present invention.

FIG. 3 is an operational view of the present invention of a driving information display device in the preferred embodiment of the present invention. In this preferred embodiment, the driving information displace device is mounted to be used with a motorcycle. It is worth mentioning that the present invention is able to be used with any vehicle where the operator is required to maintain a view of his or her surroundings. These vehicles can include bicycles, motorcycles, automobiles, boats, planes, etc. This figure illustrates a motorcycle with the driving information display device mounted to project the coherent visualizations 12 relating to the driving information. In this present embodiment the screen surface is realized as windshield 71 of the motorcycle is the realized screen surface that the coherent visualizations 12 can be projected on. As stated in the summary, an advantage of the present invention is that the displayed image is able to be customized and moved around the projected screen surface and this is achieved through the adjustment mechanism 13 of the present invention. This illustration also depicts the user's ability to not only customize the location of the coherent visualizations, but also the size and shape of the coherent visualizations. As previously stated, the signal unit 60 is comprised of a CPU 62, and through this CPU 62 is the user able to modify the driving information to be displayed. This degree of customization allows the user to gain a more personalized experience when operating the motorcycle, which in terns leads to a deeper enjoyment. The location customization is by means of an adjustment mechanism 101 of said projection mechanism 10. This adjustment mechanism 10 allows for the lateral and longitudinal translation of said coherent visualization 12. The coherent visualization 12 can be zoomed in and out by the adjustment mechanism 10 to adjust the display area of the coherent visualization 12. The CPU 62 of signal unit 60 allows for information customization.

Also depicted in FIG. 3 is the activation switch 30 electrically connected by an elongated wire 31 to the driving information display device in this preferred embodiment. It is worth mentioning that any means of signal transmission that allows the present invention to be activated upon the action inputted from the user is appropriate, and such wireless devices as Bluetooth devices, radio frequency devices, or infrared signals are appropriate. This activation switch 30 is placed in an area where the user is able to toggle without having to move their hand or inhibit proper operation of the vehicle. In this present invention the activation switch 30 is located on one of the handle bars of the motorcycle, and this only requires the user to quickly shift the orientation of their thumb to activate the activation switch 30 while not requiring the user to remove their field of vision from the road.

Figure 4:
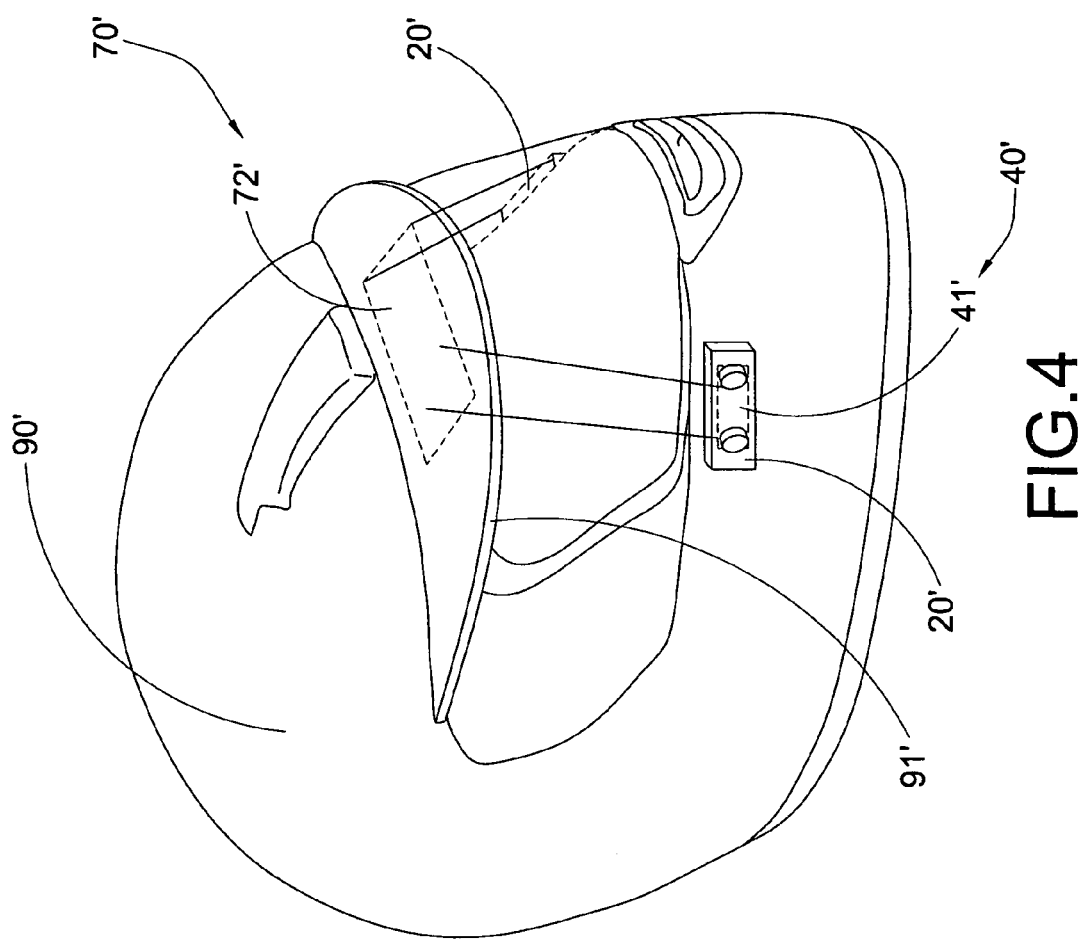
FIG. 4 is an additional operational view detailing the projected images of the present invention of a driving information display device in the preferred embodiment of the present invention.

FIG. 4 is a perspective view of the driving information display device in an additional embodiment of the present invention. In this additional embodiment the driving information display device is embodied as a projection mechanism 10' housed within at least one housing body 20', preferably a pair of housing bodies 20' that are mounted on the motorcycle helmet of the user. In addition to these pair of housing bodies 20', this additional embodiment also realizes a screen surface 70' realized as projection screen 72' that is mounted on the upper visor 91' of the helmet 90'. In this embodiment, the pair of housing bodies 20' project the coherent visualization 12 onto the projection screen 72' mounted on the motorcycle helmet 90'. The projection mechanism 10 is activated by an activation means, such as an activation button 30, that is able to communicate with the projection mechanism 10 wireless through methods such as RF frequency, infrared, or Bluetooth. This allows the user to activate the coherent visualizations 12 at their choosing to not distract them from the present road conditions. The information is transmitted to the projection mechanisms 10 on the housing body 20' by the signal unit 60 in the same manner as the preferred embodiment of the present invention. In this present embodiment the signal unit 60 is integrated into the housing body 20' of the driving information display device which is mounted on the helmet 90', but this is not meant to limit the realization of the signal unit 60 which may be realized as a separate device that is mounted on the motorcycle itself.

The housing bodies 20' are mounted to the motorcycle helmet 90' by a fastening arrangement 40' which are embodied as hook and loop fastening strips 41' that are adhered to the helmet and the housing body respectively. Hook and loop fastening strips 41' is advantageous because it allows for a temporary affixment of the housing 20' on the helmet 90'. The preceding method is also advantageous is that it provides a very thin member in which the housing body 20' is attached to the helmet. This thinness of body not only provides a certain aesthetic quality, but also reduces any forces the user might wheel relating to the moment created by a protruding mass on the helmet. This will allow the user to remove the housing bodies 20' at their discretion.

Figure 5:
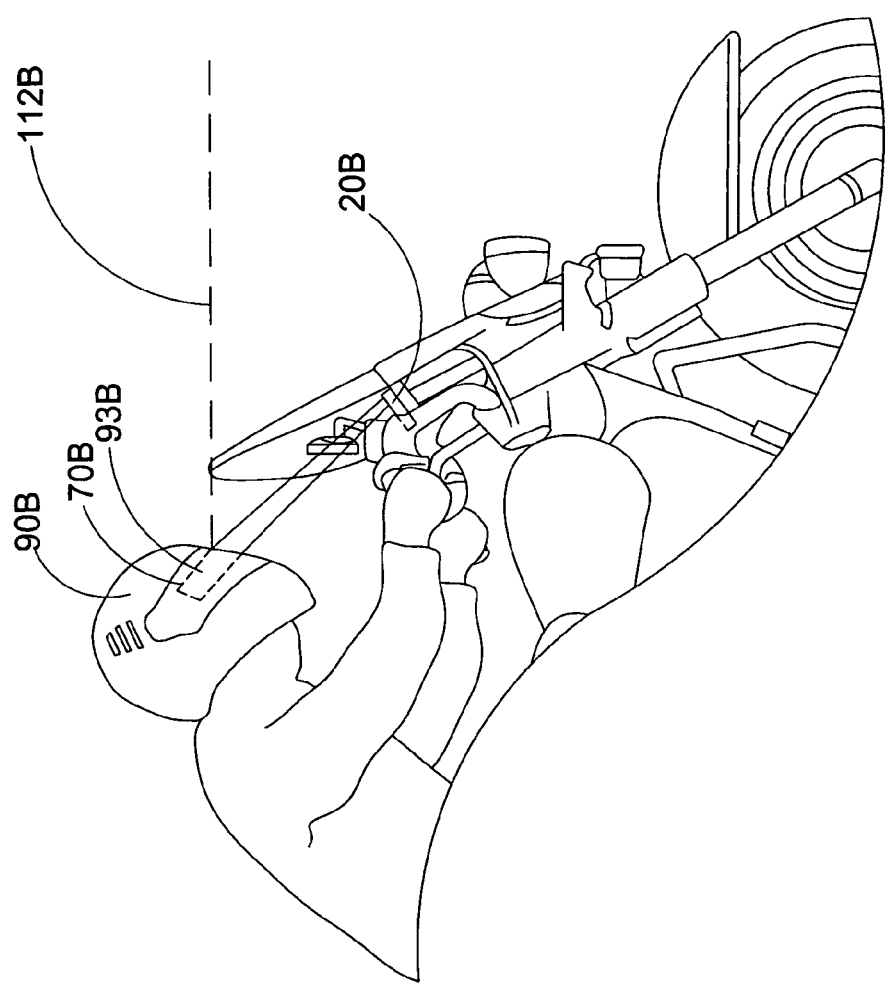
FIG. 5 is a perspective view of the driving information display device in an additional embodiment of the present invention, showing the screen at the transparent visor of the helmet.

FIG. 5 is an operational view of an additional embodiment of the present invention of a driving information display device of the present invention. This figure illustrates the driving information display device mounted on the motorcycle and projecting the driving information directly into the user's visual field 112B by means of a screen 70B created by the transparent visor of the motorcycle helmet. In this embodiment, the present invention is mounted on the motorcycle similarly to the preferred embodiment of the present invention but instead of projecting the coherent visualizations onto the screen surface embodied as the windshield, the coherent visualizations are projected on the screen surface embodied as the transparent visor 93B of the helmet 90B.

The housing body 20B is secured onto the area of the motorcycle where the projection mechanism 10 is able to project the coherent visualization 12 of the driving data onto the transparent visor 93B of the helmet 90B.

FIG. 5 also better illustrates the concept of the user's visual field 112. The term visual field is often used interchangeably with the term field of vision, but the two have fairly distinct concepts. Visual field is defined as the "spatial array of visual sensations available to observations in introspectionist psychological experiments", while field of view is defined as "the physical objects and light sources in the external world that impinge the retina." In other words, visual field is the area of view where a person is able to process the information within and not just visually detect. The normal vertical human visual field extends to approximately 60 degrees above a horizontal meridian that bisects the eye and 75 degrees below this same horizontal meridian. As a point of reference, in the United Kingdom the minimum field requirement for driving 20 degrees above and belong this horizontal meridian. In other words, any object that is outside this 20 degree arc from the horizontal meridian is outside the visual field for the purposes of driving in the United Kingdom.

Figure 6:
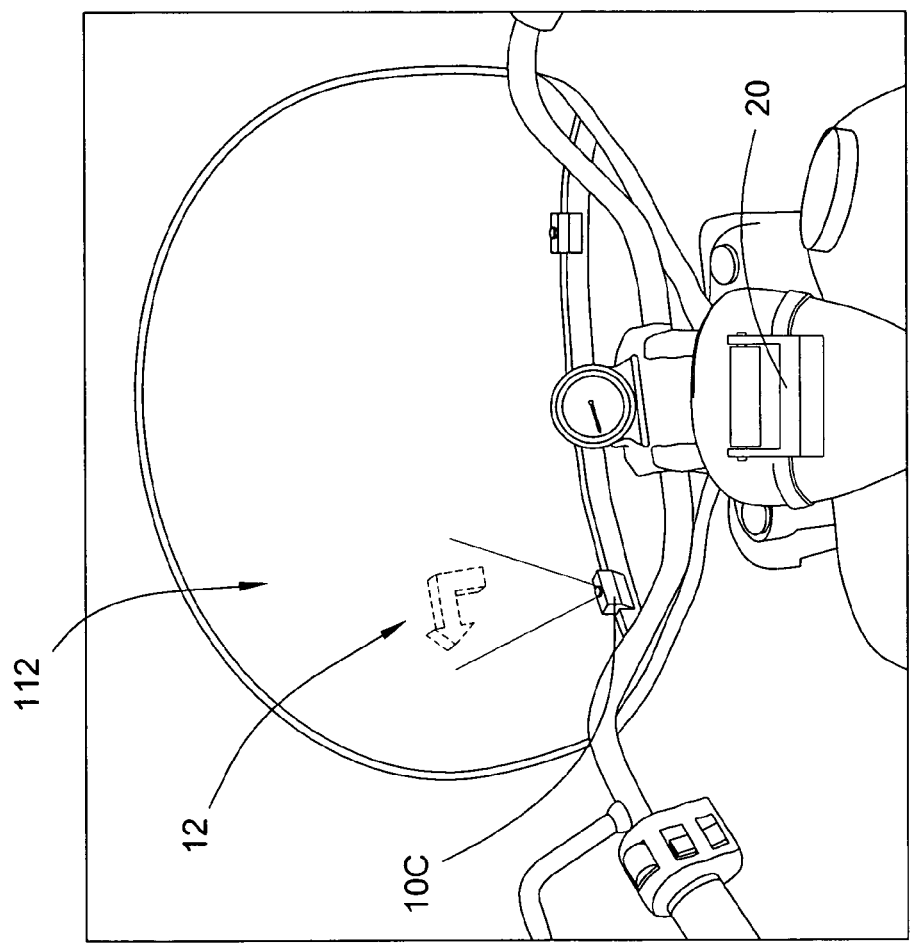
FIG. 6 is an operational view of the driving information displace device in an additional embodiment of the present invention, showing the holographic display mechanism.

FIG. 6 is an operational view of the driving information displace device in an additional embodiment of the present invention. In this present embodiment, the driving information is provided on a holographic display mechanism instead of the projector as mentioned above. This holographic display mechanism 10C of the display means enables three-dimensional images to be made by using laser or other similar devices, wherein the three-dimensional images are displayed at the user's visual field 112. The holographic display mechanism 10C is secured onto the area of the vehicle where the holographic display mechanism 10C is able to project the coherent visualization 12 of the driving data at the user's visual field 112.

Figure 7:
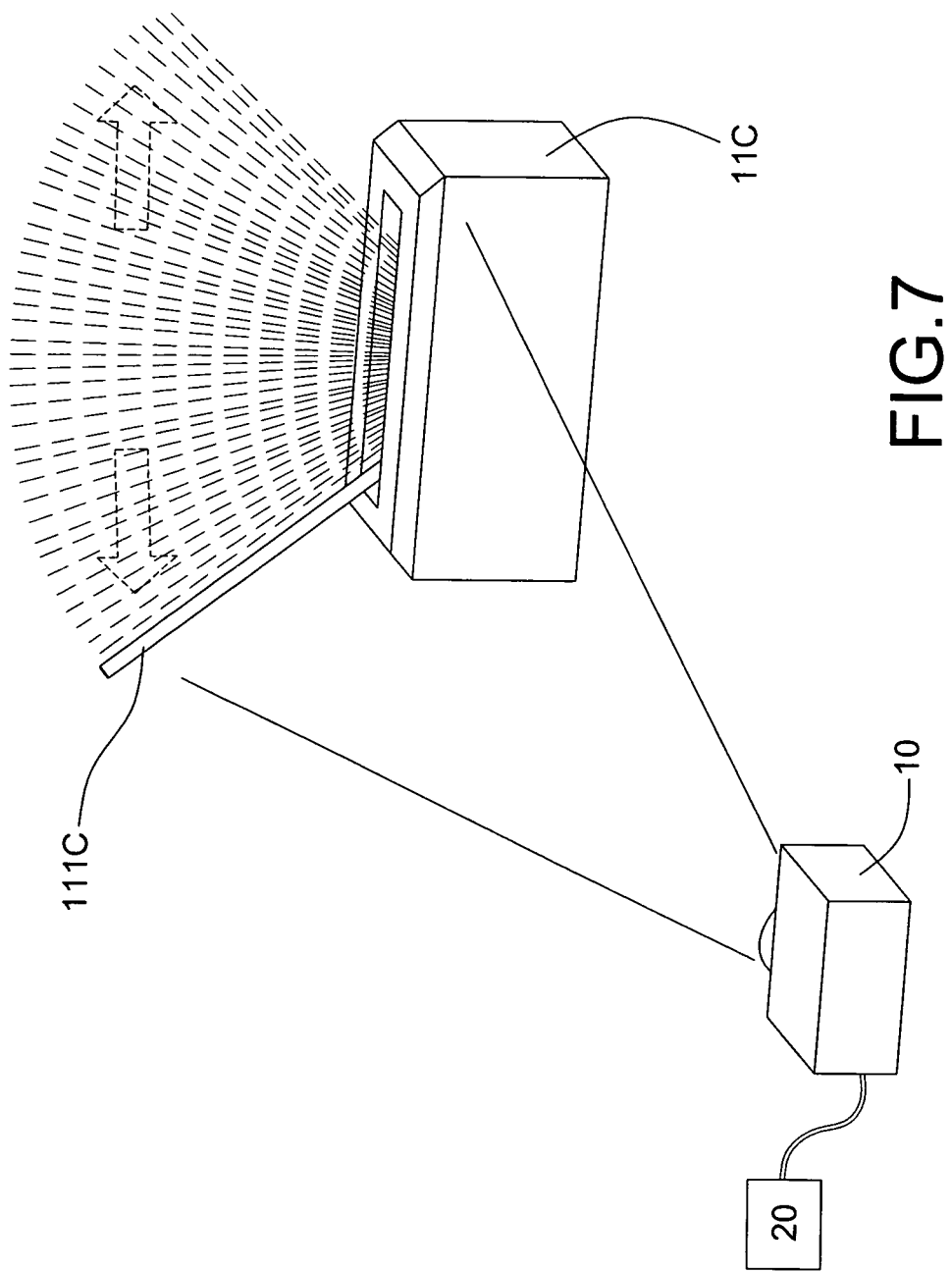
FIG. 7 is an operational view of the driving information display device in an additional embodiment of the present invention, showing the screen formed by the reciprocating pendulum.

FIG. 7 illustrates the display means works by a rapidly reciprocating pendulum 11C to incorporate with the projection mechanism 10, wherein the reciprocating pendulum 11C comprises a reciprocating pendulum arm 111C to be moved in a reciprocating manner to form a screen. The driving information is able to be displayed on the "virtual" screen created by this rapidly reciprocating pendulum arm 111C. The pendulum reciprocates at a frequency fast enough to where the reciprocating pendulum arm 111C is unable to be seen by the human eye, thus creating the effect of a virtual screen. The driving information is then able to be provided on this "virtual" screen formed by the reciprocating pendulum arm 111C.

Also in this additional embodiment, the housing body 20 of the driving information unit is electrically connected to the display means by an elongated cable. This allows for the present invention to be more portable as housing body 20 of the driving information unit can be permanently affixed to the vehicle and the display means can be connected when the user desires. Additionally, the display means can be removed when the user parks somewhere and the driving information unit can remain affixed on the vehicle in a secure location to prevent theft of the present invention.

Figure 8:
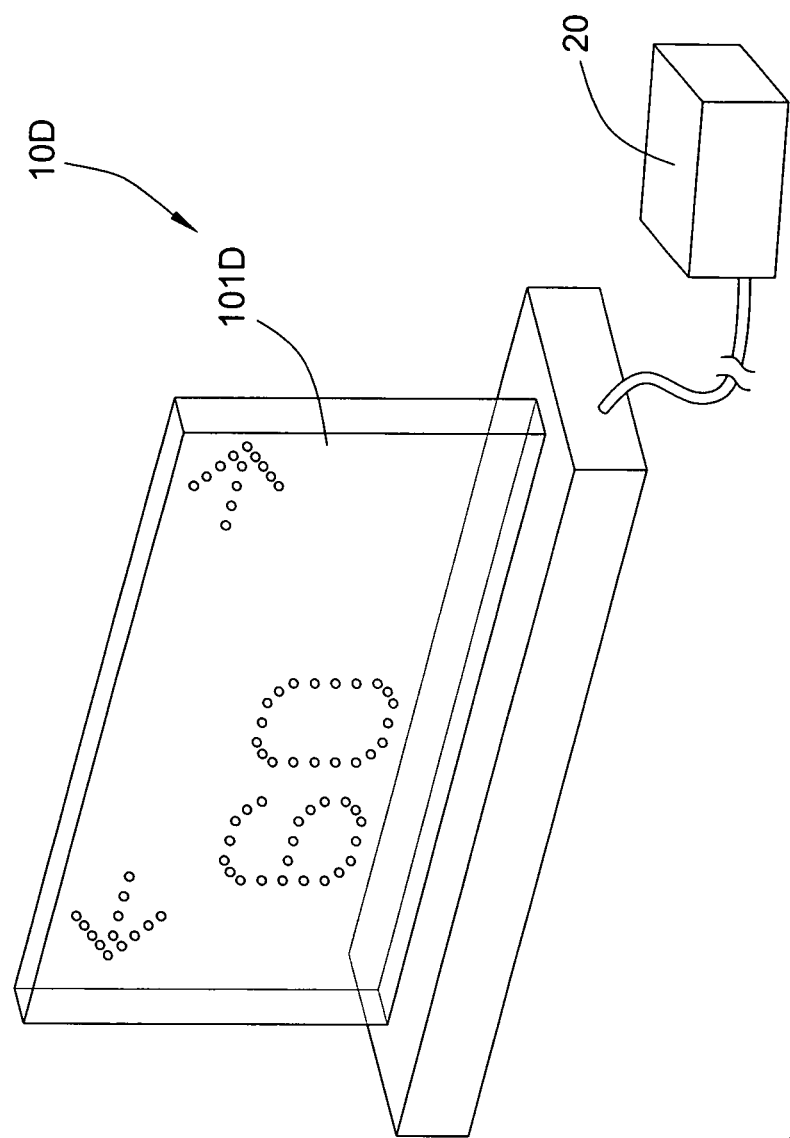
FIG. 8 is an operational view of the driving information display device in an additional embodiment of the present invention, showing the LED module.

FIG. 8 is an operational view of the driving information display device in an additional embodiment of the present invention. The display unit is embodied as a LED module 10D which comprises the screen 101D. The LED module 10D is able to provide the driving information directly on the screen 101D which is further described as the LED module screen 101D. This LED module screen has a high amount of transparency when not activated, and is able to display the driving information with an adjustable opacity. This allows the user to place this LED module screen on a wide variety of areas such as the windshield, or a helmet provided they are within the user's visual field. Aside from this variation in the provided display process the present embodiment has identical functionality as the preferred embodiment of the present invention.

Figure 9:
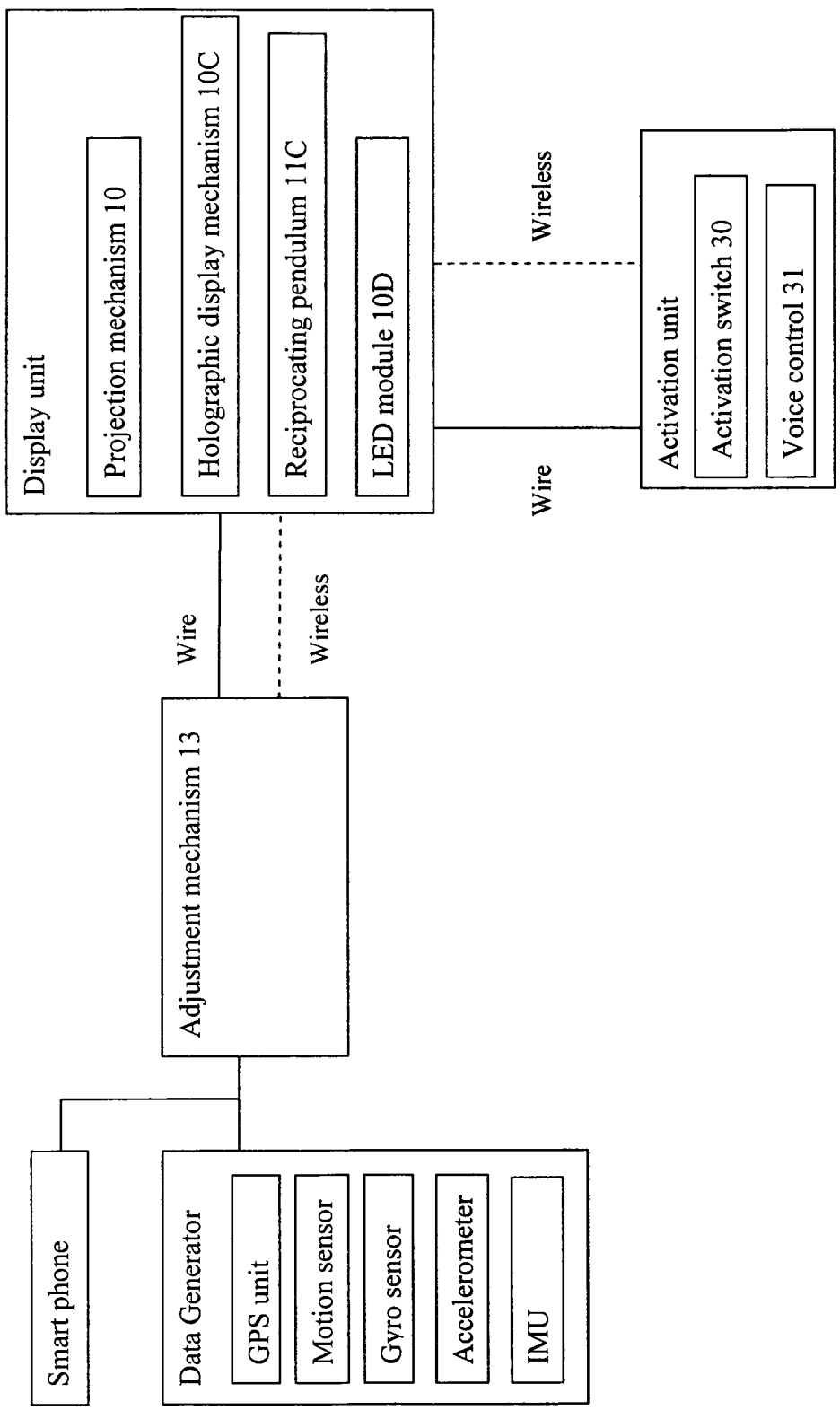
FIG. 9 is a block diagram of the driving information display device according to the above preferred embodiment of the present invention.

As shown in FIG. 9, it should be appreciated that the data generator can be a GPS unit and/or a motion sensing unit. For example, the GPS unit will collect data of speed, distance traveled, direction, and navigation. Motion sensing unit will collect data of distance, speed, acceleration, orientation, and gravitational force. The motion sensing unit can be a motion sensor, such as an infrared motion sensor, gyro sensor, accelerometer, and/or IMU (inertial measurement unit). It is worth mentioning that two or more different units of the data generator can be incorporated at the same time to generator corresponding driving information to be displayed.

Furthermore, the display means can be connected to a smart phone of the user, wherein the data generator can collect the information directly from the smart phone of the user. In other words, the smart phone will be the data generator. In particular, the adjustment mechanism 13 is linked to the smart phone. For example, the adjustment mechanism 13 can be an application installed into the smart phone, wherein when the adjustment mechanism 13 is executed in the smart phone, the adjustment mechanism 13 becomes a controller to send the information from the smart phone to the display means. Likewise, the adjustment mechanism 13 can be an external hardware operatively connected to the smart phone to send the information from the smart phone to the display means.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A driving information display device for a motorcycle, comprising:

a data generator adapted for connecting to a smart phone of a driver to collect data of speed, direction, and navigation from the smart phone as driving information of the motorcycle;

a display unit which comprises a projector linked to said data generator for projecting said driving information on a mirror of the motorcycle that reflects said driving information from said projector thereon so as to provide a visualization of said driving information into a visual field of the driver within the driver's line of sight without requiring the driver to remove said visual field away from the road;

a fastening arrangement which comprises an elongated strap with two ends and two fasteners provided at two ends of said elongated strap respectively, wherein said strap is long enough for detachably wrapping around a body of the motorcycle to firmly affix said display unit on the body of the motorcycle;

an adjustment mechanism which comprises a controller linked to said display unit and being actuated to select said driving information to be displayed by said display unit and to adjust and customize said visualization of said driving information within the driver's line of sight; and an activation switch wirelessly linked to said display unit to selectively activate said display unit to provide said visualization, wherein said activation switch is arranged for coupling at a handlebar of the motorcycle at a location close to a driver's hand position.

2. The driving information display device, as recited in claim 1, wherein said data generator further comprises a motion sensing unit that self-collects data of distance, speed, acceleration, orientation, and gravitational force of the motorcycle, wherein said motion sensing unit is selected from the group consisting of a GPS unit, a motion sensor, a gyro sensor, an accelerometer, and IMU, wherein said data generator is wirelessly connected to said display unit.

3. The driving information display device, as recited in claim 2, wherein said controller of said adjustment mechanism is a software to be installed into the smart phone to select said driving information to be displayed and to adjust and customize said visualization of said driving information via the smart phone, wherein said adjustment mechanism is linked to said display unit for translating said visualization in lateral and longitudinal directions, and for adjusting a display area of said visualization.

4. The driving information display device, as recited in claim 3, wherein said projector is detachably mounted on the body of the motorcycle for projecting said driving information on a visor of the driver's helmet.

5. The driving information display device, as recited in claim 3, wherein said projector is detachably mounted on the body of the motorcycle for projecting said driving information on a windshield of the motorcycle.

6. The driving information display device, as recited in claim 1, wherein said controller of said adjustment mechanism is a software to be installed into the smart phone to select said driving information to be displayed and to adjust and customize said visualization of said driving information via the smart phone, wherein said adjustment mechanism is linked to said display unit for translating said visualization in lateral and longitudinal directions, and for adjusting a display area of said visualization.

7. The driving information display device, as recited in claim 1, wherein said projector is detachably mounted on the body of the motorcycle for projecting said driving information on a visor of the driver's helmet.

8. The driving information display device, as recited in claim 1, wherein said projector is detachably mounted on the body of the motorcycle for projecting said driving information on a windshield of the motorcycle.

9. A method of providing driving information of a motorcycle for a driver, comprising the steps of:
  (a) collecting data of speed, direction, and navigation from a smart phone of the driver as said driving information of the motorcycle by a data generator when said data generator is connected to the smart phone;
  (b) detachably and adjustably locating a display unit a body of the motorcycle by detachably wrapping an elongated strap of said display unit around the body of the motorcycle; and
  (c) selectively customizing which driving information to be displayed by said display unit via a controller of an adjustment mechanism;
  (d) wirelessly activating said display unit by an activation switch to provide said visualization, wherein said activation switch is arranged for coupling at a handlebar of the motorcycle at a location close to a driver's hand position; and
  (e) projecting said driving information by a projector of said display unit on a mirror of the motorcycle that reflects said driving information from said projector thereon to provide a visualization of said driving information by said display unit into a visual field of the driver within the driver's line of sight without requiring the driver to remove said visual field away from the road.

10. The method as recited in claim 9 wherein, in the step (a), said data generator further comprises a motion sensing unit that self-collects data of distance, speed, acceleration, orientation, and gravitational force of the motorcycle, wherein said motion sensing unit is selected from the group consisting of a GPS unit, a motion sensor, a gyro sensor, an accelerometer, and IMU, wherein said data generator is wirelessly connected to said display unit.

11. The method, as recited in claim 10, wherein the step (a) further comprises a step of installing said controller of said adjustment mechanism as a software into the smart phone to select said driving information to be displayed and to adjust and customize said visualization of said driving information via the smart phone, wherein the step (c) further comprises the steps of translating said visualization in lateral and longitudinal directions and adjusting a display area of said visualization via said adjustment mechanism.

12. The method, as recited in claim 11, wherein the step (b) further comprises a step of providing two fasteners at two ends of said strap respectively to detachably wrap around the body of the motorcycle.

13. The method as recited in claim 12 wherein, in the step (c), said driving information is projected on a visor of the driver's helmet.

14. The method as recited in claim 12 wherein, in the step (c), said driving information is projected on a windshield of the motorcycle.

15. The method, as recited in claim 9, wherein the step (a) further comprises a step of installing said controller of said adjustment mechanism as a software into the smart phone to select said driving information to be displayed and to adjust and customize said visualization of said driving information via the smart phone, wherein the step (c) further comprises the steps of translating said visualization in lateral and longitudinal directions and adjusting a display area of said visualization via said adjustment mechanism.

16. The method, as recited in claim 9, wherein the step (b) further comprises a step of providing two fasteners at two ends of said strap respectively to detachably wrap around the body of the motorcycle.

17. The method as recited in claim 9 wherein, in the step (c), said driving information is projected on a visor of the driver's helmet.

18. The method as recited in claim 9 wherein, in the step (c), said driving information is projected on a windshield of the motorcycle.

* * * * *